Aug. 21, 1956

O. E. WOLFF 2,759,519

METHOD AND APPARATUS FOR APPLYING TEMPLES TO EYEGLASS FRAMES

Filed April 22, 1954

INVENTOR
Otto E. Wolff

BY Brown and Mikulka
ATTORNEYS

Aug. 21, 1956  O. E. WOLFF  2,759,519
METHOD AND APPARATUS FOR APPLYING
TEMPLES TO EYEGLASS FRAMES
Filed April 22, 1954  2 Sheets-Sheet 2

INVENTOR
Otto E. Wolff

BY Brown and Mikulka
ATTORNEYS

United States Patent Office 2,759,519
Patented Aug. 21, 1956

2,759,519

METHOD AND APPARATUS FOR APPLYING TEMPLES TO EYEGLASS FRAMES

Otto E. Wolff, Sudbury, Mass., assignor to Polaroid Corporation, Cambridge, Mass., a corporation of Delaware Application April 22, 1954, Serial No. 424,824

10 Claims. (Cl. 154—1.6)

The present invention relates to the manufacture of spectacles and, as illustrated herein, relates more particularly to devices for and methods of folding and applying sheet material about the upper edge portion of a pair of eyeglass frames to form inexpensive temples therefor.

Stereoscopic motion pictures depend for their realism upon the simultaneous conveyance to the viewer of two distinct, although closely related pictures. One of these pictures represents the scene as it would actually be viewed by an observer's left eye and the other picture represents the scene as it would actually be viewed by an observer's right eye. Optical means are provided for rendering only the left-eye picture visible to the left eye of the observer and only the right-eye picture visible to the right eye as both pictures are simultaneously projected on a motion picture screen. The only practical method thus far devised for this purpose is one in which the stereoscopic pairs of pictures are projected on a screen in differently polarized light and in which the viewer is provided with polarizing spectacles or eyeglasses which optically separate the two images so that only one image becomes visible to each eye. These polarizing spectacles are ordinarily provided by the motion picture exhibitor and are usually made of inexpensive materials so that the spectacles may be discarded after they have once been used. Such spectacles must not only be low in cost, but they must also be comfortable to wear and must stay in position without effort on the part of the viewer.

An object of the present invention, accordingly, is to provide a novel apparatus which will quickly and inexpensively apply temples to eyeglass frames formed of inexpensive sheet material such as paper. To this end, and in accordance with a feature of the invention, the present machine is provided with means for folding and adhesively securing a strip of paper to the upper edge portion of a pair of eyeglasses and is also arranged to provide in the fold of said paper a deformable reenforcing member which is effective to stiffen the temples while still permitting the temples to be bent or twisted into the shape desired by the wearer.

A further object of the invention is to provide a novel method of applying temples to eyeglasses wherein an advancing strip of sheet material is adhesively coated on one surface, folded and again supplied with an adhesive coating, feeding a core of stiffening material onto the folded sheet, advancing an eyeglass frame into engagement with said folded sheet, and forming a second fold in said strip to cause the upper edge portion of said frame to be embraced by said second fold and to be secured thereto by pressure applied to said strip as said strip is being advanced.

Other objects of the invention will in part be obvious and will in part appear hereinafter.

The invention accordingly comprises the method involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
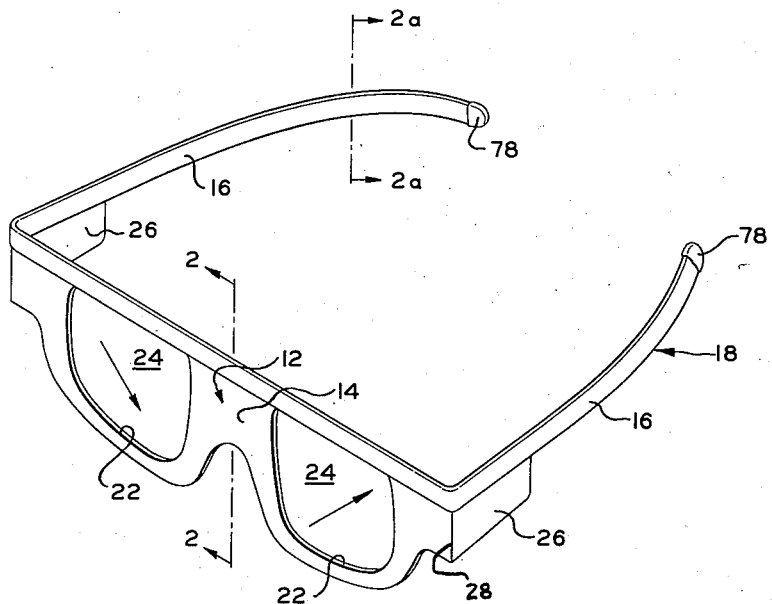
Figure 1 is a perspective view of a pair of spectacles produced by the method and apparatus of the present invention.
Figures 2, 2A:
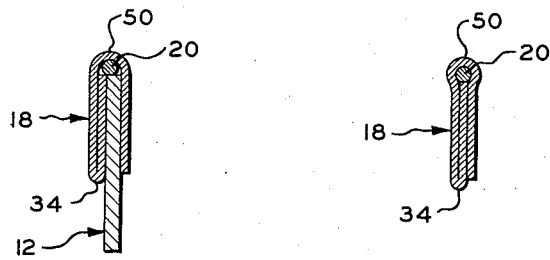
Fig. 2 is a view in cross section of the spectacles taken along the line 2—2 of Fig. 1.
Fig. 2a is a view in cross section taken along the line 2a—2a of Fig. 1.

Spectacles of the type produced in accordance with the present invention are illustrated in Figs. 1, 2 and 2a. These spectacles comprise a frame 12 having a bridge portion 14 and a pair of elongated temples or bows 16. The bows 16 are extensions of a folded strip 18 extending over the top edge portion of the frame 12 and are adhesively secured thereto, as will later be described. The folded strip 18 is provided at its top fold line with a core or stiffener 20 formed preferably of deformable material such as steel or other suitable wire.

The frame 12 is provided with apertures 22 within which suitable transparent sheets 24 may be retained. The sheets 24 are polarizers having axes of polarization oriented at substantially right angles to each other as indicated by arrows in Fig. 1. The sheet material 24 may comprise, by way of example, a transparent hydrophilic linear polymeric plastic stretched or otherwise treated to orient the molecules thereof and stained with a suitable dichroic dye.

The frame 12 is preferably constructed from a pair of laminated identical stampings between which the polarizing sheets or windows 24 are interposed. The frame 12 is formed preferably of relatively stiff rigid sheet material, such as paper, and the frames are superposed and secured together by suitable adhesive which may also impart additional stiffness and rigidity to the assembled frames 12. The frames 12 are also provided with extensions 26 which are separated from the body of the frame by score lines 28.

The temples or bows 16 are formed preferably from a continuous narrow strip of sheet material, such for example as paper, which is folded upon itself to form three-ply extensions beyond both ends of the frame 12 and in the upper fold line of which is incorporated the wire stiffener or core 20 above referred to. The intermediate portion of the strip 18 is arranged to embrace and to be folded over the upper edge portion of the frame 12 and is adhesively secured thereto; thus forming a continuous strip of material which imparts additional rigidity to the frame 12 and which also extends beyond the ends of the extensions 26 to form rigid temples 16 to maintain the spectacles or viewers comfortably seated and easily retained in viewing position on the face of the wearer.

Figure 3:
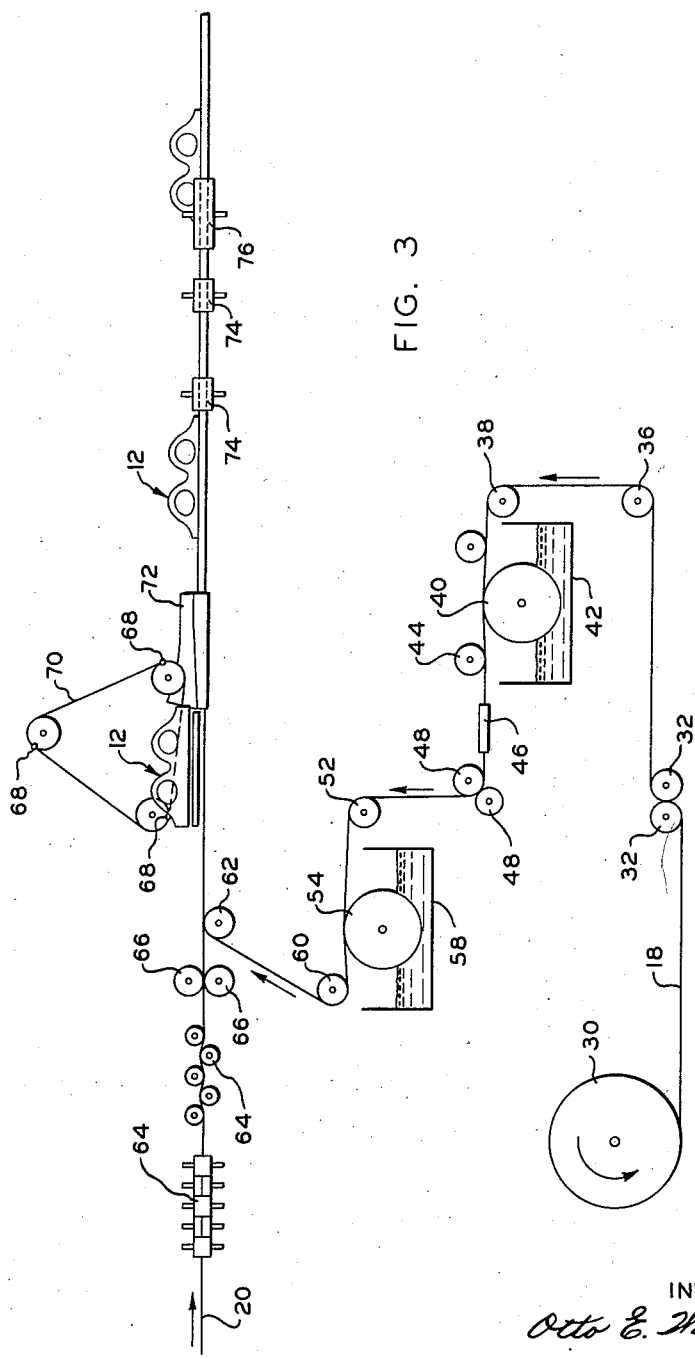
Fig. 3 is a schematic representation of the apparatus embodying a preferred form of the present invention.

The machine illustrated diagrammatically in Fig. 3 includes continuously operating mechanisms for folding the strip 18, for applying adhesive thereto and for inserting the spectacle frames in the fold in spaced positions along the folded strip 18. The paper strip 18 is taken from a supply roll 30 and is fed between a pair of crease rolls 32 which form a crease 34 about which the strip 18 is first folded. The strip 18 passes from the crease rolls about guide rolls 36 and 38 and over a glue-applying roll 40 which is rotatively mounted in suitable journals formed on the side walls of a heated glue pot 42. The strip 18 then passes under a guide roll 44 through a folder 46 which folds the strip 18 upon itself about the crease line 34. The folded strip then passes between a pair of crease rolls 48 which form a second crease 50 in the folded strip 18. The crease rolls 48 are so arranged that they also press the folded strip 18 to cause the adhesively coated portions thereof to adhere to each other. After the folded strip 18 has passed between the crease rolls 48, it passes over a guide roll 52 and over a glue roll 54 mounted in suitable journals in a second heated glue pot 58. The strip 18 is maintained in adhesive-applying contact by a guide roll 60 about which the folded and adhesively coated strip 18 passes to a guide roll 62. After the strip has advanced beyond the guide roll 62, the folded and adhesively coated strip 18 is folded about the crease line 50 to form a V into which spectacle frames 12 are successively fed, as will later be described.

It is apparent that after the strip 18 has passed the second glue roll 54 it is provided with two coats of adhesive which act not only to secure the over-folded portions together, but are effective also to increase the stiffness and rigidity of the over-folded strip 18. In order, however, to make the portions of the folded strip 18 extending beyond the ends of the spectacle frame deformable to retain the eyeglasses or the spectacles comfortably in viewing position, the wire 20, hereinbefore referred to, is introduced into the folded strip 18 at the crease line 50. The wire is supplied from a suitable supply roll (not shown) and passes through suitable wire straightening mechanism 64 of any suitable conventional design and between a pair of feed rolls 66 which are driven from a suitable source of power and at the same linear velocity as the paper strip 18.

Spectacle frames 12 are supported upside down in suitable supply trays and are removed therefrom by suitable feed devices which deliver successive frames 12 in position to be engaged by one of the feed pins 68 on a sprocket chain 70. Sprocket chain 70 advances the frame 12 at the same linear speed as the strip 18. As the frame 12 is advanced by the finger of pin 68 the frame 12 is engaged by a guide member 72 which forces the frame 12 downwardly and seats the lower edge thereof in the second fold or crease line 50 in the strip 18 and against the stiffening wire 20. At this point, the strip 18 is folded upwardly to embrace the lower edge portion of the frame 12. The frame 12 and the folded strip 18 advance and are engaged by suitable presser rolls 74 which press the folded portions of the strip 18 against the opposed surfaces of the frame 12, thus causing the strip 18 to adhere firmly to the frame 12. The presser rolls 74 are also effective to press the over-folded portions of the strip 18 extending beyond the ends of the frame 12 against each other and thus cause them to adhere to each other. The wire 20 is located in the crease of fold line 50 and serves both to stiffen the edge portion of the frame 12 and also to provide a deformable member which may be bent or twisted into shape to cause the spectacles to fit the wearer.

The machine is also provided with a pair of cut-off rolls 76 between which the continuous folded strip 18 passes and which is effective to sever both the folded strip 18 and the enclosed stiffening wire 20 to form individual spectacles.

The individual spectacles may be removed from the cutting station either manually or automatically. The separate spectacles may be removed by means of a suitable conveyor and, if desired, additional operations may be performed thereon. Preferably, the spectacles are removed manually, inspected and plastic caps or buttons 78 are fixed to the ends of the temples to prevent injury to the wearer by cutting or scratching on contact with the severed ends thereof.

It is to be noted that the frames 12 are supported upside down in supply trays and are moved out of said trays and into the path of movement of the strip 18 with the top or brow portion of the frames 12 downward. Thus when the frames 12 and the strips 18 are assembled and the separated spectacles are in position to be worn, the folded strip 18 will embrace the upper or brow portion of the frames 12, as is clearly shown in Figure 1. This provides a neat finished edge for the brow portion of the spectacles.

Although the present invention has been described with particular reference to spectacles having light-polarizing sheets covering the apertures 22, it is apparent that any other suitable transparent material could be used if the spectacles are to be used for purposes other than viewing stereoscopic motion pictures wherein the right- and left-eye stereoscopic images are light polarized at right angles to each other.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. A method of applying temples to eyeglasses which comprises the steps of folding adhesively coated portions of a strip of sheet material, applying adhesive to the folded strip, feeding a relatively stiff core onto said folded strip, folding said strip, advancing an eyeglass frame into the second fold to cause the upper edge portion of said frame and said stiff core to be embraced by said second fold, and applying pressure to said strip of material to cause the adhesively coated portions to adhere to the upper edge portion of said frame and to each other beyond said frames.

2. A method of applying temples to eyeglasses which comprises the steps of folding adhesively coated portions of an advancing flat strip of sheet material, applying a coat of adhesive to the folded strip, feeding a stiff member onto said strip, advancing eyeglass frames onto said strip at spaced intervals, folding said strip to cause the upper edge portions of said frames to be embraced by said second fold, and applying pressure to said folded strip as it advances to cause the adhesively coated portions thereof to adhere to the upper edge portions of said spaced frames and to each other beyond said frames.

3. A method of applying temples to eyeglasses which comprises the steps of advancing a continuous strip of sheet material, applying a strip of adhesive to said strip as it advances, folding the strip on itself as the strip advances to form a folded and an unfolded portion, forming a fold line in said strip adjacent to the folded portion thereof, applying adhesive to said folded and unfolded portions, feeding a stiffening wire along said fold line, advancing eyeglass frames onto said strip at spaced intervals, folding said strip about said first fold line to cause the upper edge of said frames to engage said second fold as the second fold is being formed, pressing said folded strip to cause the adhesively coated portions thereof to adhere to the upper edge portions of said frames and to each other beyond the ends of each of said frames to form temples therefor, and severing said folded strip intermediate said frames to form individual eyeglasses having resilient temples extending beyond each end of said frame.

4. A machine for applying temples to eyeglasses and having, in combination, means for continuously advancing a relatively narrow flat strip of adhesively coated sheet material, means for folding said strip as it advances, means for applying an adhesive to said folded strip as said strip advances, means for moving a stiffening element onto said folded strip, means for moving eyeglass frames into the path of movement of said folded strip and for moving the upper edge portions of said frames into position to be received by a second fold, means for folding said strip about said first fold and about the upper edge of said frames, said frames being arranged in spaced relation to each other along said strip whereby the folded strip between said frames forms temples for said eyeglass frames, and means for pressing said folded strip to cause the folded portions to adhere to each other and to the upper edge portions of said frames.

5. A machine for applying temples to eyeglasses and having, in combination, means for continuously advancing a relatively narrow flat strip of adhesively coated sheet material, means for folding said strip as it advances, means for applying an adhesive to said folded strip as it advances, means for moving a stiffening element onto said folded strip, means for moving eyeglass frames into the path of movement of said folded strip and for feeding the upper edge portions of said frames onto said strip adjacent to said stiffening element, means for folding said strip about said element and the upper edge portions of said frames, said frames being arranged in spaced relation to each other whereby the folded strip between said frames forms temples for said eyeglass frames, and means for pressing said strip to cause said strip to adhere to the upper edge portions of said frames and to each other beyond said eyeglass frames.

6. A machine for applying temples to eyeglasses and having, in combination, means for continuously advancing a relatively narrow flat strip of sheet material, means for folding said strip as it advances, means for moving a stiffening element onto said folded strip, means for moving eyeglass frames into the path of movement of said folded strip and for introducing the upper edge portions of a frame into a second fold, means for forming a second fold in said strip embracing the upper portions of said frames, said frames being arranged in spaced relation to each other along said strip whereby the folded strip between said frames forms temples for said eyeglass frames, and means for adhesively securing said strip about the upper edge portions of said frames.

7. A machine for applying temples to eyeglasses and having, in combination, means for continuously advancing a relatively narrow flat strip of sheet material, means for applying adhesive to said strip, means for folding said strip as it advances, means for applying adhesive to the folded strip, means for moving a stiffening element onto said folded strip, means for moving eyeglass frames into the path of movement of said folded strip and for introducing the upper portions of said frames into a second fold, means for forming a second fold in said strip embracing the upper edges of said frames, said frames being arranged in spaced relation to each other along said strip whereby the folded strip between said frames forms temples for said eyeglass frames, and means for adhesively securing said strip about the upper edge portions of said frames.

8. A machine for applying temples to eyeglasses and having, in combination, means for continuously advancing a relatively narrow flat strip of sheet material, means for applying adhesive to said strip, means for folding said strip lengthwise upon itself as it advances, means for forming a fold line in said strip adjacent to said folded portion, means for applying adhesive to said folded strip, means for moving a stiffening element onto said folded strip, means for moving eyeglass frames into the path of movement of said folded strip and for introducing the upper edges of said frames into said second fold line, said frames being arranged in spaced relation to each other along said strip whereby the folded strip between said frames forms temples for said eyeglass frames, means for forming a second fold about said fold line, and means for pressing said strip to cause the folded portions thereof to adhere to each other and to the upper portions of said frames.

9. A machine for applying temples to eyeglasses and having, in combination, means for continuously advancing a relatively narrow flat strip of sheet material, means for applying adhesive to said strip, means for folding said strip lengthwise upon itself as it advances, means for forming a fold line in said strip adjacent to said folded portions, means for applying adhesive to said folded strip, means for moving eyeglass frames into the path of movement of said folded strip and for introducing the upper edges of said frames into said second fold line, said frames being arranged in spaced relation to each other along said strip whereby the folded strip between said frames forms temples for said eyeglass frames, means for forming a second fold about said second fold line, means for inserting a strip of relatively rigid material into the second-mentioned fold, and means for pressing said folded strip to cause said folded portions to adhere to each other and to the upper edge portions of said frames.

10. A machine for applying temples to eyeglasses and having, in combination, means for continuously advancing a relatively narrow flat strip of sheet material, means for applying adhesive to said strip, means for folding said strip lengthwise upon itself as it advances, means for forming a fold line in said strip adjacent to said folded portion, means for moving eyeglass frames into the path of movement of said folded strip and for introducing the upper edges of said frames into said second fold, said frames being arranged in spaced relation to each other along said strip whereby the folded strip between said frames forms temples for said eyeglass frames, means for feeding a continuous strip of relatively stiff material into the fold line formed in said strip to increase the rigidity thereof, means for forming a second fold in said strip about said fold line whereby the folded strip embraces the upper edge portions of said eyeglass frames, and means for pressing said folded strip to cause said folded portions thereof to adhere to each other and to the upper edge portions of said frames.

References Cited in the file of this patent

UNITED STATES PATENTS

| | | |
|---|---|---|
| 2,177,117 | Potdevin | Oct. 24, 1939 |
| 2,625,862 | Bokenkroger et al. | Jan. 20, 1953 |
| 2,719,565 | Wolff | Oct. 4, 1955 |